United States Patent
Zhu et al.

(10) Patent No.: US 11,242,715 B2
(45) Date of Patent: Feb. 8, 2022

(54) BULLHEAD-SHAPED GROOVED DIVERSION JET AND EMPENNAGE SWING VIBRATION SUPPRESSION DEVICE AND METHOD

(71) Applicant: Southwest Petroleum University, Chengdu (CN)

(72) Inventors: Hongjun Zhu, Chengdu (CN); Xiaonian Tan, Chengdu (CN); Tang Tang, Chengdu (CN); Yuhang Qi, Chengdu (CN); Jie Hu, Chengdu (CN)

( * ) Notice: Subject to any disclaimer, the term of this patent is extended or adjusted under 35 U.S.C. 154(b) by 0 days.

(21) Appl. No.: 17/151,210

(22) Filed: Jan. 17, 2021

(65) Prior Publication Data
US 2021/0246734 A1    Aug. 12, 2021

(30) Foreign Application Priority Data
Feb. 8, 2020   (CN) .......................... 202010083145.8

(51) Int. Cl.
| | |
|---|---|
| F15D 1/00 | (2006.01) |
| E21B 17/01 | (2006.01) |
| F04D 29/66 | (2006.01) |
| F16L 1/12 | (2006.01) |

(52) U.S. Cl.
CPC .............. *E21B 17/01* (2013.01); *F04D 29/66* (2013.01); *F15D 1/0055* (2013.01); *F15D 1/0065* (2013.01); *F16L 1/123* (2013.01)

(58) Field of Classification Search
CPC .......... E21B 17/01; F04D 29/66; F16L 1/123; F15D 1/10; F15D 1/0065; B63B 21/66
See application file for complete search history.

(56) References Cited

U.S. PATENT DOCUMENTS

| | | | | | |
|---|---|---|---|---|---|
| 3,611,976 | A | * | 10/1971 | Hale | B63B 21/663 |
| | | | | | 114/243 |
| 4,365,574 | A | * | 12/1982 | Norminton | B63B 21/663 |
| | | | | | 114/243 |
| 4,474,129 | A | * | 10/1984 | Watkins | E21B 17/01 |
| | | | | | 114/243 |
| 5,456,199 | A | * | 10/1995 | Kernkamp | B63B 21/663 |
| | | | | | 114/111 |
| 5,722,340 | A | * | 3/1998 | Sweetman | F15D 1/10 |
| | | | | | 114/243 |

(Continued)

*Primary Examiner* — Benjamin F Fiorello
(74) *Attorney, Agent, or Firm* — Bochner IP, PLLC; Andrew D. Bochner

(57) ABSTRACT

A bullhead-shaped grooved diversion jet and empennage swing vibration suppression device and method. The device consists of an impeller diversion module and a drainage rotary cover module. The impeller diversion module consists of a center impeller, sleeve bearings, small impellers, and small impeller rotating shafts. The drainage rotary cover module consists of a drainage front cover, a perforated jet rear cover, and empennages. The device is mounted on an outer wall of a riser in a sleeving manner. Under a combined action of drainage and space allocation of horizontal rectangular grooves, flow rate distribution of the center impeller, flow direction adjustment of the small impellers, diversion of lateral diversion holes, jet flows of side rear reducing holes, flowing space division and wake vortex turbulence of rotary swinging empennages, around-flow boundary layers at two sides and a tail of the riser are deeply damaged, which suppresses the formation of large vortexes.

3 Claims, 4 Drawing Sheets

(56) References Cited

U.S. PATENT DOCUMENTS

| | | | | |
|---|---|---|---|---|
| 5,738,034 A * | 4/1998 | Wolff | B63B 21/502 | 114/243 |
| 5,765,968 A * | 6/1998 | Lee | B08B 1/00 | 405/211 |
| 5,984,584 A * | 11/1999 | McMillan | E21B 17/01 | 114/243 |
| 6,010,278 A * | 1/2000 | Denison | B63B 21/502 | 405/216 |
| 6,223,672 B1 * | 5/2001 | Allen | E21B 17/01 | 114/243 |
| 6,347,911 B1 * | 2/2002 | Blair | E01D 19/02 | 24/462 |
| 6,896,447 B1 * | 5/2005 | Taquino | E21B 17/01 | 405/216 |
| 7,017,666 B1 * | 3/2006 | Allen | B63B 21/502 | 114/243 |
| 7,458,752 B2 * | 12/2008 | Esselbrugge | B63B 21/502 | 405/216 |
| 7,600,945 B2 * | 10/2009 | Burgess | B63B 21/502 | 405/216 |
| 8,500,367 B2 * | 8/2013 | Somerville | E21B 17/01 | 405/216 |
| 10,252,780 B2 * | 4/2019 | Godoy | B63B 21/663 | |
| RE48,123 E * | 7/2020 | Masters | F16L 11/12 | |
| 2002/0168232 A1 * | 11/2002 | Xu | E21B 17/01 | 405/224 |
| 2004/0175240 A1 * | 9/2004 | McMillan | F16L 1/123 | 405/211 |
| 2007/0215028 A1 * | 9/2007 | Lie | F16L 1/123 | 114/243 |
| 2008/0135232 A1 * | 6/2008 | Lawler | E21B 17/01 | 166/173 |
| 2008/0236469 A1 * | 10/2008 | Masters | F16L 1/123 | 114/243 |
| 2012/0168019 A1 * | 7/2012 | Allen | E21B 17/012 | 138/103 |
| 2014/0044488 A1 * | 2/2014 | Critsinelis | B63B 21/26 | 405/172 |

* cited by examiner

BULLHEAD-SHAPED GROOVED DIVERSION JET AND EMPENNAGE SWING VIBRATION SUPPRESSION DEVICE AND METHOD

TECHNICAL FIELD

The present disclosure belongs to the field of vortex-induced vibration suppression devices for marine risers, and particularly relates to a bullhead-shaped grooved diversion jet and empennage swing vibration suppression device and method.

BACKGROUND

With rapid development of human society and economy, the proven oil and gas resources on land have been continuously developed and utilized, and the total amount shows a downward trend. In particular, China's dependence on foreign oil and gas remains high, so vigorous development of marine oil and gas resources has become an important breakthrough. As a key transportation channel of marine oil and gas exploitation, the service environment of a marine riser is complex and harsh. When an ocean current flows through the riser, there will be alternately shed vortices at the tail of the riser to produce a periodic fluid acting force, which stimulates vortex-induced vibration, causes fatigue damage of the riser, and results in shut-in, pump stop, and well repair operation, thereby not only causing huge economic losses, but also causing serious damage to ecological environment. Therefore, the suppression of the vortex-induced vibration is a premise of safe exploitation of marine oil and gas.

Common vortex-induced vibration suppression devices are divided into two types of active control and passive control. An active control suppression device mainly disturbs flow field structures and suppresses the generation of vortices by means of suction, jet and the like, but it is necessary to provide additional energy for suction or injection, which increases the difficulty in mounting the device. A passive control suppression device mainly destroys an around-flow boundary layer by changing a shape of a surface of the riser, so as to achieve an objective of suppressing vortex shedding. However, it often can only adapt to one flow direction, so the scope of application is narrow. If a jet flow can be generated without external energy injection, actual needs of flow direction changes can be adapted, and the combination of active suppression and passive suppression functions can be realized, then it is more beneficial to practical engineering application.

SUMMARY

The present disclosure provides a bullhead-shaped grooved diversion jet and empennage swing vibration suppression device and method, which have convenience in mounting and dismounting without energy consumption, combining the advantages of active control and passive control, with respect to the disadvantages proposed in the BACKGROUND of the existing vortex-induced vibration suppression device for a marine riser.

To achieve the above objective, the present disclosure adopts the following technical solution:

A bullhead-shaped grooved diversion jet and empennage swing vibration suppression device consists of an impeller diversion module and a drainage rotary cover module. The impeller diversion module includes a center impeller, two sleeve bearings, eight small impellers, and two small impeller rotating shafts. The drainage rotary cover module includes a drainage front cover, a perforated jet rear cover, and two empennages.

The center impeller is of an inner-outer ring structure embedded with a cylindrical roller. An inner ring of the center impeller is fixed to an outer wall of a riser. Arc-shaped blades are uniformly distributed in a circumferential direction of a surface of an outer ring. Under the impact of a water flow, the center impeller may rotate clockwise around the riser. The sleeve bearing is of an inner-outer ring structure embedded with a cylindrical roller. The two sleeve bearings are mounted on the outer wall of the riser at an interval of greater than the height of one center impeller in a sleeving manner, and are distributed on the upper side and the lower side of the center impeller. The space between a lower surface of an upper sleeve bearing and an upper surface of the center impeller is one third of the height of one sleeve bearing. The space between an upper surface of a lower sleeve bearing and a lower surface of the center impeller is one third of the height of one sleeve bearing.

The drainage front cover is one third of a hollow cylinder, and a circular front drainage hole is formed in the center of a convex surface, directly facing an incident flow direction, of the drainage front cover. The angle of an arc corresponding to the front drainage hole is 20 degrees. An upper annular end surface and a lower annular end surface of the drainage front cover are respectively mounted on an upper surface of the upper sleeve bearing and a lower surface of the lower sleeve bearing in a clamping manner. The perforated jet rear cover is a hollow elliptical cylinder provided with a gap, and the minor axis of the elliptical cylinder is equal to the diameter of the cylinder of the drainage front cover. An upper annular surface and a lower annular surface of the perforated jet rear cover are also respectively mounted on the upper surface of the upper sleeve bearing and the lower surface of the lower sleeve bearing in a clamping manner. The drainage front cover is seamlessly butted with the perforated jet rear cover by bolts. The drainage front cover fills the circumferential gap of the perforated jet rear cover. An integrated drainage rotary cover is formed after the drainage front cover is butted with the perforated jet rear cover, and the center impeller is covered therein. Symmetrical lateral diversion holes are formed in two side surfaces of the perforated jet rear cover in a minor axis direction of the elliptical cylinder. A fan-shaped bump is arranged on an inner wall surface, directly facing the front drainage hole of the drainage front cover, of the perforated jet rear cover. Symmetrical side rear reducing holes are formed in the wall, on two sides of the fan-shaped bump, of the perforated jet rear cover. The diameters of the side rear reducing holes are gradually reduced from inside to outside. Four equally spaced horizontal rectangular grooves are formed in an inner wall of the drainage rotary cover formed by the drainage front cover and the perforated jet rear cover.

Circular holes for fixing the small impellers are symmetrically formed in the upper annular surface and the lower annular surface of the perforated jet rear cover in the minor axis direction. The two small impeller rotating shafts penetrate through the circular holes and are fixed to two sides of the center impeller. Four small impellers are mounted in the axial direction of each small impeller rotating shaft at equal space in a sleeving manner. The orientations of concave surfaces of arc-shaped blades of the small impellers are opposite to the orientation of a concave surface of an arc-shaped blade of the center impeller.

An empennage support column for fixing the empennages is mounted on an outer wall surface of one side, provided with the fan-shaped bump, of the perforated jet rear cover. One end of each of the two empennages is mounted on the empennage support column in a sleeving manner, and the other ends of the two empennages may rotate around the empennage support column. A spring is connected between the two empennages, so as to limit relative displacement between the two empennages.

A bullhead-shaped grooved diversion jet and empennage swing vibration suppression method is provided by using the bullhead-shaped grooved diversion jet and empennage swing vibration suppression device. When an ocean current flows through the riser and forms attack angles with the empennages, the empennages rotate under the impact of the ocean current to drive the overall device to rotate to a counter flow side of the riser, and a central line of an acute angle of the two empennages is parallel to the velocity direction of the ocean current. The ocean current flows into the drainage hole of the drainage front cover and impacts on arc-shaped blades of the center impeller to drive the center impeller to rotate, which dissipates a water flow impact force that is directly applied to the riser originally. The rotation of the center impeller makes flow rates of the ocean current that flows through two sides of the center impeller unequal, which realizes flow rate allocation in space. The ocean current flows around the two sides of the center impeller, and flows along the hollow channel of the device and the horizontal rectangular grooves of a cover wall. The ocean current drives the small impellers to rotate when flowing to the small impellers, which further adjusts the flow velocity and the flow direction of the ocean current. One part of the ocean current is jetted out from the lateral diversion holes along the tangential direction of the rotation of the small impellers, and a jet flow is perpendicular to the direction of the ocean current outside the cover, so that kinetic energy of a fluid is injected into an around-flow boundary layer of the drainage rotary cover, which pushes a boundary layer separation point backwards; the other part of the ocean current continues flowing along the horizontal rectangular grooves and reaches the side rear reducing holes to increase the flow velocity due to the diameter reducing and throttling effects of the side rear reducing holes, so as to form the jet flow at the tail of the perforated jet rear cover, thereby disturbing alternate shedding of a vortex on the counter flow side of the riser. The horizontal rectangular grooves and the small impellers are arranged in the vertical direction, so that the flow velocity of the ocean current that flows out from the lateral diversion holes are non-uniform in the vertical direction, thereby destroying a three-dimensional spatial structure of a flow field around the riser. The ocean current which flows inside the device drives the center impeller to rotate clockwise, so as to drive the small impellers to rotate anticlockwise, thereby achieving an accelerating effect on the ocean current in the device. The small impellers are arranged in the vertical direction according to certain space, so that the flow direction of the ocean current transfers in the vertical direction. In addition, a limiting spring limits relative displacement of the two empennages, and the jet flows jetted from the side rear reducing holes impact the empennages, so that the empennages perform rotary opening and closing motion around the empennage support column, thereby disturbing the development of a shear layer, and suppressing the formation of the vortex. Therefore, under a combined action of drainage and space allocation of the horizontal rectangular grooves, flow rate distribution of the center impeller, flow direction adjustment of the small impellers, diversion of the lateral diversion holes, jet flows of the side rear reducing holes, and flowing space division and wake vortex turbulence of rotary swinging empennages, around-flow boundary layers of the two sides and the tail of the riser are deeply damaged, which suppresses the formation of large vortexes, thereby realizing suppression of vortex-induced vibration by combining advantages of active and passive suppression.

Due to the adoption of the technical solution above, the present disclosure has the following advantages:

1. the device of the present disclosure is a mounting unit, could be mounted at the proper position, and could rotate adaptively according to the direction of the ocean current to adapt to incoming flows in different directions;

2. part of the water flows jetted from the side rear reducing holes of the device of the present disclosure impacts the empennages to make the empennages rotate and swing, which combines the functions of active suppression and passive suppression, and enhances a suppression effect;

3. the drainage front cover, the perforated jet rear cover, the empennages, and the rotary impellers of the device of the present disclosure are all made of light materials, so that the overall device is light in weight and is not easy to corrode.

Figure 1:
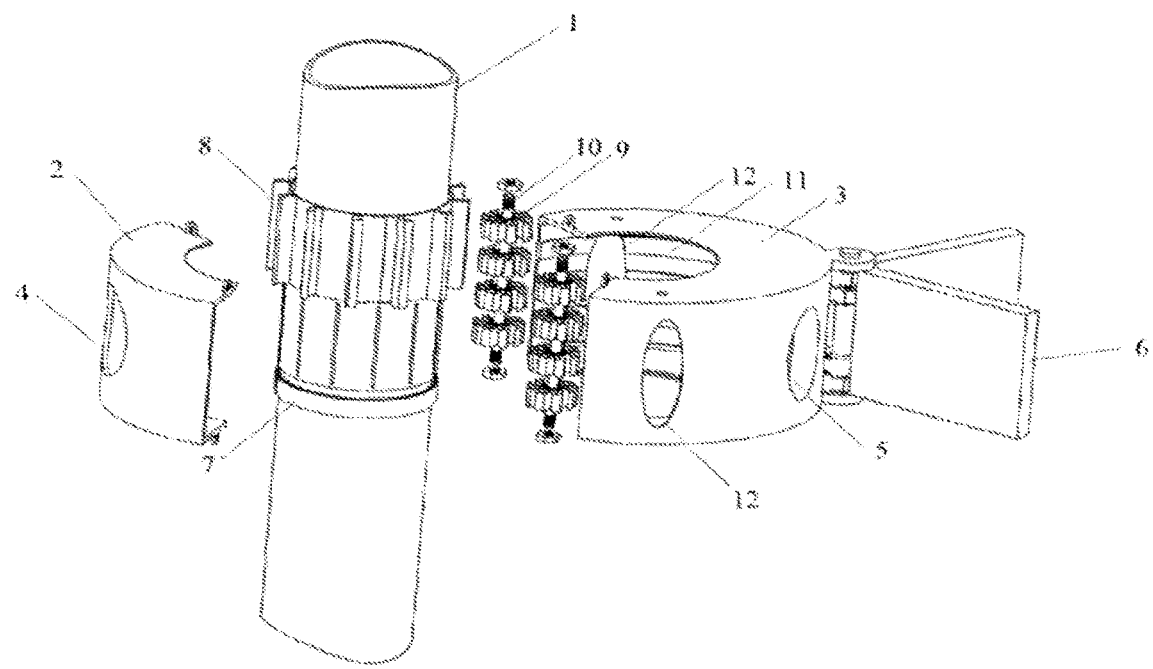
FIG. 1 is a split schematic diagram of a three-dimensional structure of a device of the present disclosure.

In the drawings: 1—riser; 2—drainage front cover; 3—perforated jet rear cover; 4—front drainage hole; 5—side rear reducing hole; 6—empennage; 7—sleeve bearing; 8—center impeller; 9—small impeller; 10—small impeller rotating shaft; 11—horizontal rectangular groove; 12—lateral diversion hole.

DETAILED DESCRIPTION

Specific implementation of the present disclosure will be further described below with reference to the accompanying drawings.

As shown in FIG. 1, a bullhead-shaped grooved diversion jet and empennage swing vibration suppression device consists of an impeller diversion module and a drainage rotary cover module. The impeller diversion module includes a center impeller 8, two sleeve bearings 7, eight small impellers 9, and two small impeller rotating shafts 10. The drainage rotary cover module includes a drainage front cover 2, a perforated jet rear cover 3, and two empennages 6.

Figure 2:
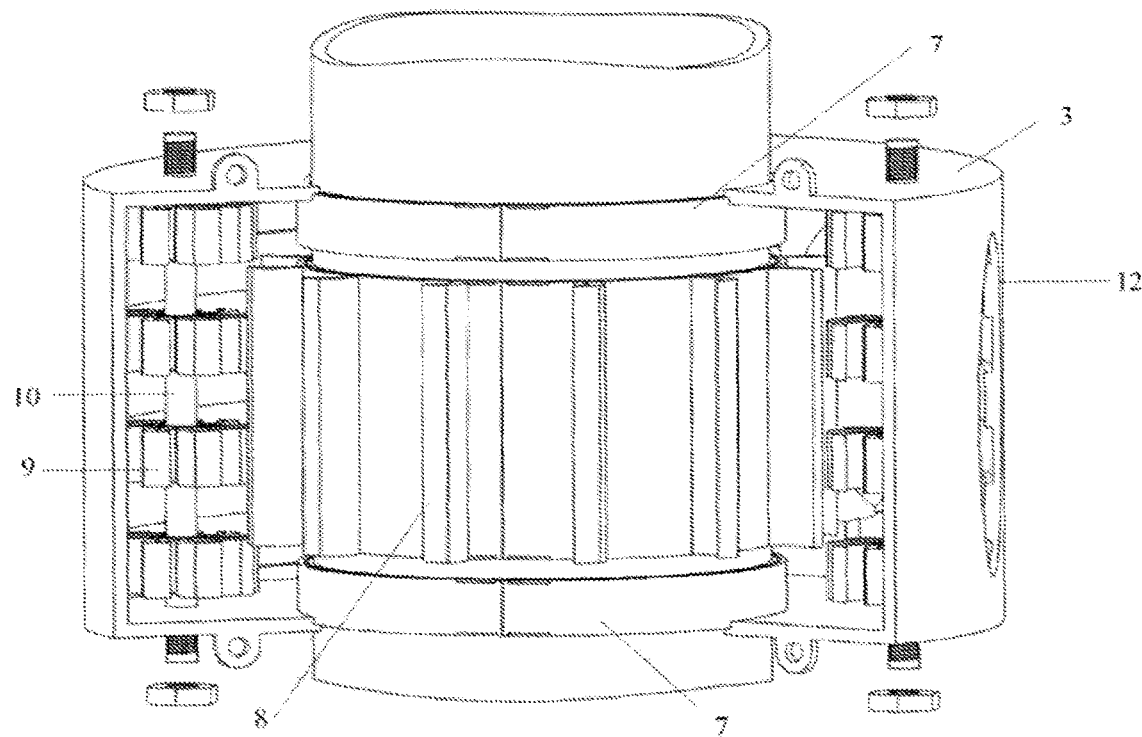
FIG. 2 is an assembly diagram of a center impeller and small impellers of the device of the present disclosure.

As shown in FIG. 2, the center impeller 8 is of an inner-outer ring structure embedded with a cylindrical roller. An inner ring of the center impeller is fixed to an outer wall of a riser 1. Arc-shaped blades are uniformly distributed in a circumferential direction of a surface of an outer ring. Under the impact of a water flow, the center impeller 8 may rotate clockwise around the riser 1. The sleeve bearing 7 is of an inner-outer ring structure embedded with a cylindrical roller. The two sleeve bearings 7 are mounted on an outer wall of the riser 1 at an interval of greater than the height of one center impeller 8 in a sleeving manner, and are distributed on the upper side and the lower side of the center impeller 8. The space between the lower surface of an upper sleeve bearing 7 and the upper surface of the center impeller 8 is one third of the height of one sleeve bearing 7. The space between the upper surface of a lower sleeve bearing 7 and the lower surface of the center impeller 8 is one third of the height of one sleeve bearing 7.

Figure 4:
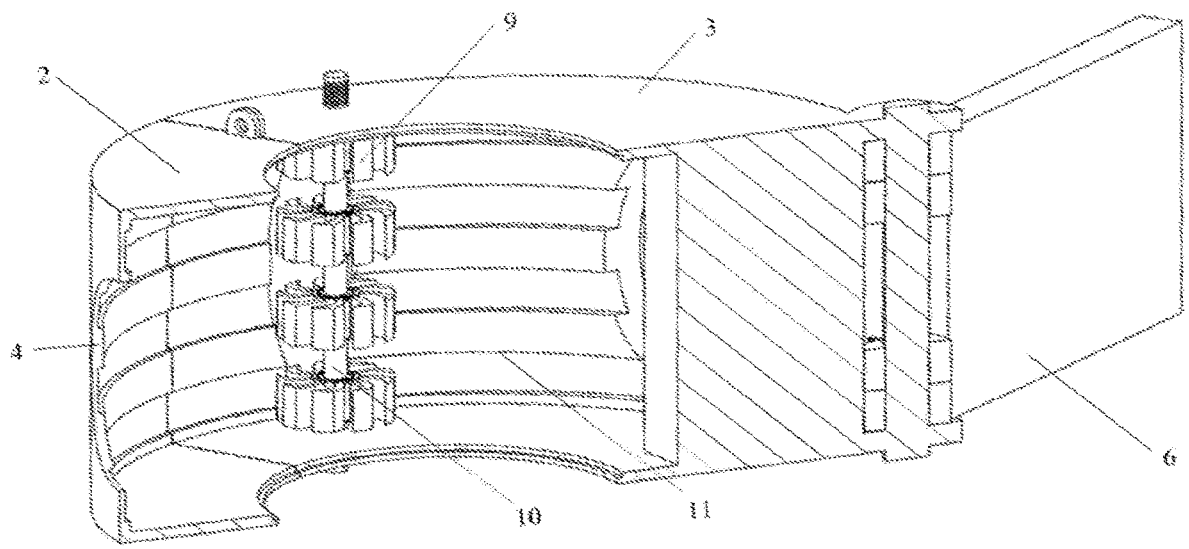
FIG. 4 is a partial sectional view of the device of the present disclosure.

The drainage front cover 2 is one third of a hollow cylinder, and a circular front drainage hole 4 is formed in the center of a convex surface, directly facing an incident flow direction, of the drainage front cover. The angle of an arc corresponding to the front drainage hole 4 is 20 degrees. An upper annular end surface and a lower annular end surface of the drainage front cover 2 are respectively mounted on the upper surface of the upper sleeve bearing 7 and the lower surface of the lower sleeve bearing 7 in a clamping manner. The perforated jet rear cover 3 is a hollow elliptical cylinder provided with a gap, and the minor axis of the elliptical cylinder is equal to the diameter of the cylinder of the drainage front cover 2. An upper annular surface and a lower annular surface of the perforated jet rear cover 3 are also respectively mounted on the upper surface of the upper sleeve bearing 7 and the lower surface of the lower sleeve bearing 7 in a clamping manner. The drainage front cover 2 is butted with the perforated jet rear cover 3 seamlessly by bolts. The drainage front cover 2 fills the circumferential gap of the perforated jet rear cover 3. An integrated drainage rotary cover is formed after the drainage front cover 2 is butted with the perforated jet rear cover 3, and the center impeller 8 is covered therein. Symmetrical lateral diversion holes 12 are formed in two side surfaces of the perforated jet rear cover 3 in a minor axis direction of the elliptical cylinder. A fan-shaped bump is arranged on an inner wall surface, directly facing the front drainage hole 4 of the drainage front cover 2, of the perforated jet rear cover 3. Symmetrical side rear reducing holes 5 are formed in the wall, on two sides of the fan-shaped bump, of the perforated jet rear cover 3. The diameters of the side rear reducing holes 5 are gradually reduced from inside to outside. Four equally spaced horizontal rectangular grooves 11 are formed in an inner wall of the drainage rotary cover formed by the drainage front cover 2 and the perforated jet rear cover 3, as shown in FIG. 4.

Figure 3:
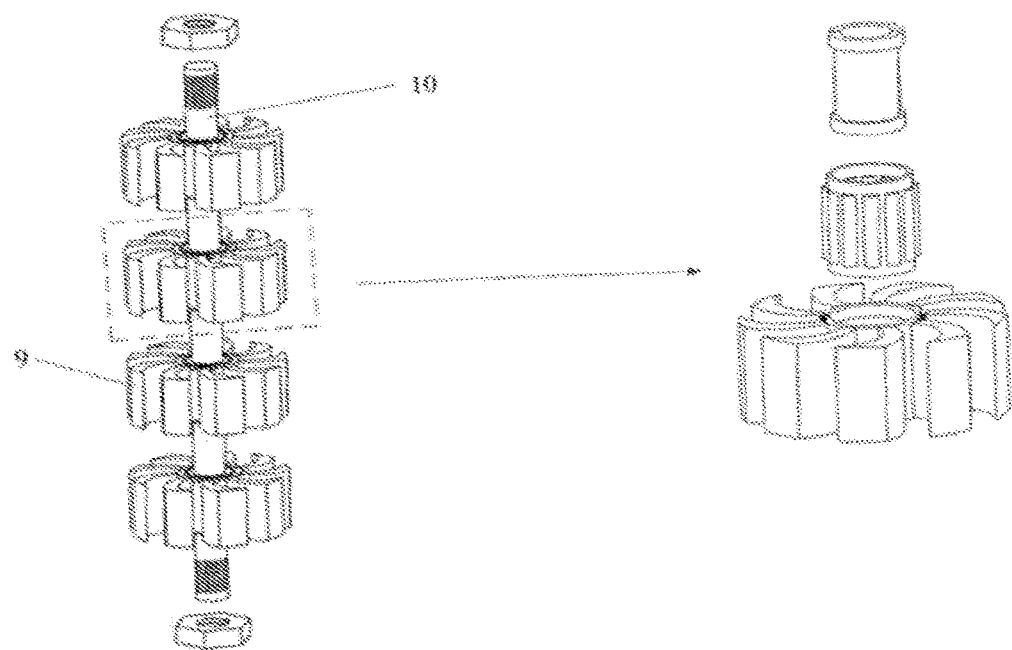
FIG. 3 is a schematic structural diagram of small impellers of the device of the present disclosure.

Circular holes for fixing the small impellers 9 are symmetrically formed in the upper annular surface and the lower annular surface of the perforated jet rear cover 3 in the minor axis direction. The two small impeller rotating shafts 10 penetrate through the circular holes and are fixed to two sides of the center impeller 8. Four small impellers 9 are mounted in the axial direction of each small impeller rotating shaft 10 at equal space in a sleeving manner, as shown in FIG. 3, the orientations of concave surfaces of arc-shaped blades of the small impellers 9 are opposite to the orientation of a concave surface of an arc-shaped blade of the center impeller 8.

An empennage support column for fixing the empennages 6 is mounted on the outer wall surface of one side, provided with the fan-shaped bump, of the perforated jet rear cover 3. One end of each of the two empennages 6 are mounted on the empennage support column in a sleeving manner, and the other end of the two empennages may rotate around the empennage support column. A spring is connected between the two empennages 6, so as to limit relative displacement between the two empennages 6.

Figure 6:
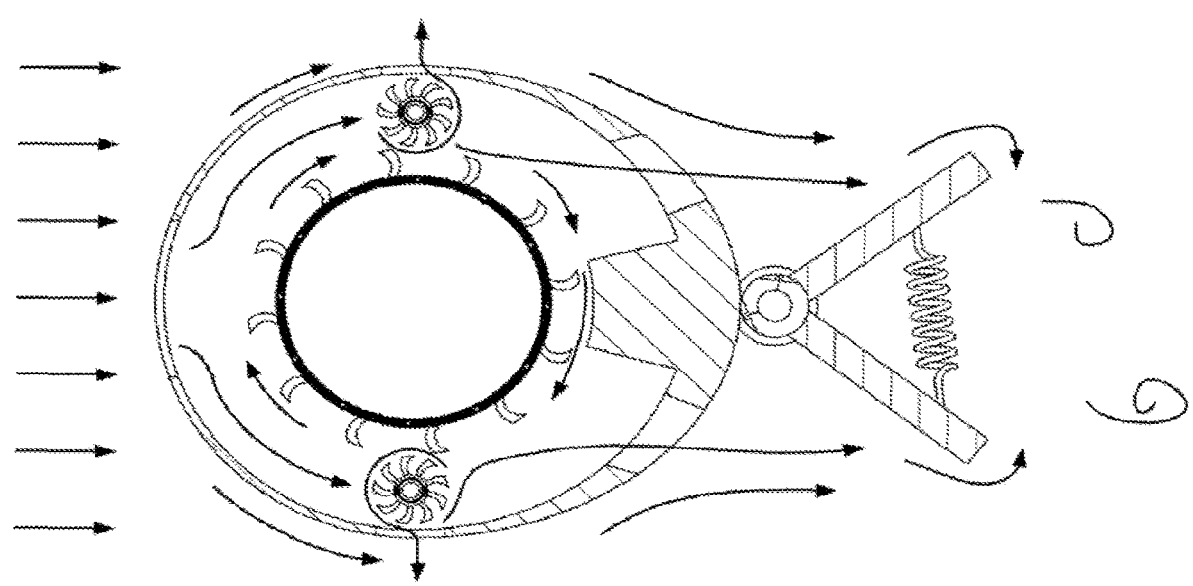
FIG. 6 is a schematic working diagram of the device of the present disclosure.

A bullhead-shaped grooved diversion jet and empennage swing vibration suppression method is provided by using the bullhead-shaped grooved diversion jet and empennage swing vibration suppression device. As shown in FIG. 6, when an ocean current flows through the riser 1 and forms attack angles with the empennages 6, the empennages 6 rotate under the impact of the ocean current to drive the overall device to rotate to a counter flow side of the riser 1, and the central line of an acute angle of the two empennages 6 is parallel to the velocity direction of the ocean current. The ocean current flows into the drainage hole of the drainage front cover 2 and impacts on arc-shaped blades of the center impeller 8 to drive the center impeller 8 to rotate, which dissipates a water flow impact force that is directly applied to the riser 1 originally. The rotation of the center impeller 8 makes flow rates of the ocean current that flows through two sides of the center impeller unequal, which realizes flow rate allocation in space. The ocean current flows around the two sides of the center impeller 8, and flows along the hollow channel of the device and the horizontal rectangular grooves 11 of a cover wall. The ocean current drives the small impellers 9 to rotate when flowing to the small impellers 9, which further adjusts the flow velocity and the flow direction of the ocean current. One part of the ocean current is jetted out from the lateral diversion holes 12 along the tangential direction of the rotation of the small impellers 9, and a jet flow is perpendicular to the direction of the ocean current outside the cover, so that kinetic energy of a fluid is injected into an around-flow boundary layer of the drainage rotary cover, which migrates a boundary layer separation point backwards; the other part of the ocean current continues flowing along the horizontal rectangular grooves 11 and reaches the side rear reducing holes 5 to increase the flow velocity under diameter reducing and throttling effects of the side rear reducing holes 5, so as to form the jet flow at the tail of the perforated jet rear cover 3, thereby disturbing alternate shedding of a vortex on the counter flow side of the riser 1. The horizontal rectangular grooves 11 and the small impellers 9 are arranged in the vertical direction, so that the flow velocity of the ocean current that flows out from the lateral diversion holes 12 are non-uniform in the vertical direction, thereby destroying a three-dimensional spatial structure of a flow field around the riser 1. The ocean current which flows inside the device drives the center impeller 8 to rotate clockwise, so as to drive the small impellers 9 to rotate anticlockwise, thereby achieving an accelerating effect on the ocean current in the device. The small impellers 9 are arranged in the vertical direction according to certain space, so that the flow direction of the ocean current transfers in the vertical direction. In addition, a limiting spring limits relative displacement of the two empennages 6, and the jet flows jetted from the side rear reducing holes 5 impact the empennages 6, so that the empennages 6 perform rotary opening and closing motion around the empennage support column, thereby disturbing the development of a shear layer, and suppressing the formation of the vortex. Therefore, under a combined action of drainage and space allocation of the horizontal rectangular grooves 11, flow rate distribution of the center impeller 8, flow direction adjustment of the small impellers 9, diversion of the lateral diversion holes 12, jet flows of the side rear reducing holes 5, and flowing space division and wake vortex turbulence of rotary swinging empennages 6, around-flow boundary layers of the two sides and the tail of the riser 1 are deeply damaged, which suppresses the formation of large vortexes, thereby realizing suppression of vortex-induced vibration by combining advantages of active and passive suppression.

Embodiment:

When a device of the present disclosure is mounted, first, a center impeller 8 is mounted on a riser 1 in a sleeving manner. Under the impact of a water flow, the center impeller 8 may rotate around the riser 1 clockwise. The space between an upper sleeve bearing 7 and a lower sleeve bearing 7 is determined according to the height of the center impeller 8, and the two sleeve bearings 7 are mounted on the riser 1 in a sleeving manner. The space between a lower surface of the upper sleeve bearing 7 and an upper surface of the center impeller 8 is one third of the height of one sleeve bearing 7. The space between an upper surface of the lower sleeve bearing 7 and a lower surface of the center impeller 8 is one third of the height of one sleeve bearing 7.

Then, small impellers 9 and small impeller rotating shafts 10 are mounted in a perforated jet rear cover 3. The two small impeller rotating shafts 10 penetrate through the circular holes formed in an upper annular surface and a lower annular surface of the perforated jet rear cover 3 and are fixed to two sides of the center impeller 8. Four small impellers 9 are mounted in the axial direction of each small impeller rotating shaft 10 at equal space in a sleeving manner. The orientations of concave surfaces of arc-shaped blades of the small impellers 9 are opposite to the orientation of a concave surface of an arc-shaped blade of the center impeller 8. An upper annular end surface and a lower annular end surface of the perforated jet rear cover 3 are respectively mounted on the upper surface of the upper sleeve bearing 7 and the lower surface of the lower sleeve bearing 7 in a clamping manner, as shown in FIG. 2.

Later, a drainage front cover 2 is mounted. An upper annular end surface and a lower annular end surface of the drainage front cover 2 are also respectively mounted on the upper surface of the upper sleeve bearing 7 and the lower surface of the lower sleeve bearing 7 in a clamping manner, and the drainage front cover 2 is seamlessly butted with the perforated jet rear cover 3 by bolts. An integrated drainage rotary cover is formed after the drainage front cover 12 is butted with the perforated jet rear cover 3.

Finally, two empennages 6 are mounted. One end of each of the two empennages 6 is mounted on an empennage support column in a sleeving manner, so that the other ends of the two empennages 6 may rotate around the empennage support column. A spring is connected between the two empennages 6, so as to limit relative displacement between the two empennages 6.

Figure 5:
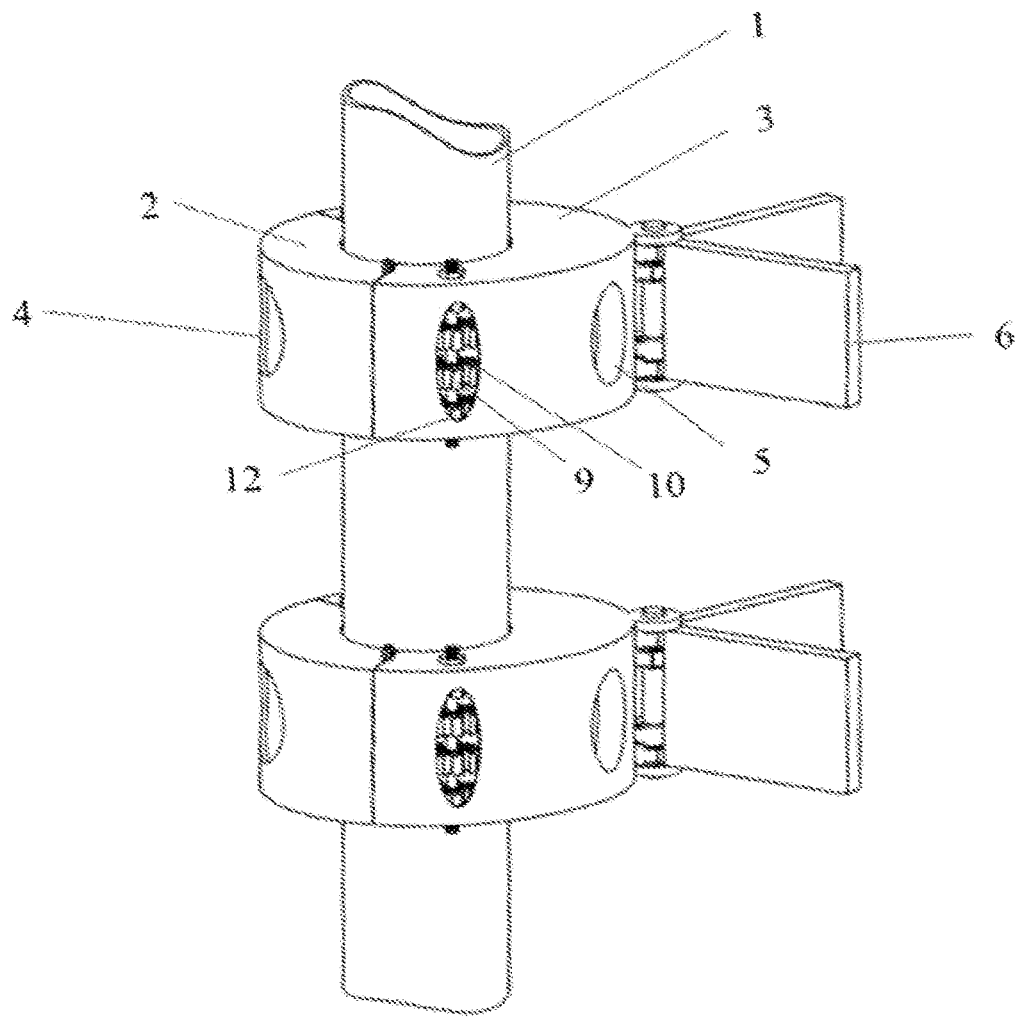
FIG. 5 is a schematic tandem mounting diagram of the device of the present disclosure.

As shown in FIG. 5, the present device is regarded as a mounting unit and is mounted in series on the riser as required.

After the mounting is completed, the device is placed in an ocean current. When the ocean current flows through the riser 1 and forms attack angles with the empennages 6, the empennages 6 rotate under the impact of the ocean current to drive the overall device to rotate to a counter flow side of the riser 1, and the central line of an acute angle of the two empennages 6 is parallel to the velocity direction of the ocean current. The ocean current flows into the drainage hole of the drainage front cover 2 and impacts on arc-shaped blades of the center impeller 8 to drive the center impeller 8 to rotate, which dissipates a water flow impact force that is directly applied to the riser 1 originally. The rotation of the center impeller 8 makes flow rates of the ocean current that flows through two sides of the center impeller 8 unequal, which realizes flow rate allocation in space. The ocean current flows around the two sides of the center impeller 8, and flows along the hollow channel of the device and the horizontal rectangular grooves 11 of a cover wall. The ocean current drives the small impellers 9 to rotate when flowing to the small impellers 9, which further adjusts the flow velocity and the flow direction of the ocean current. One part of the ocean current is jetted out from the lateral diversion holes 12 along the tangential direction of the rotation of the small impellers 9, and a jet flow is perpendicular to the direction of the ocean current outside the cover, so that kinetic energy of a fluid is injected into an around-flow boundary layer of the drainage rotary cover, which migrates a boundary layer separation point backwards; the other part of the ocean current continues flowing along the horizontal rectangular grooves 11 and reaches the side rear reducing holes 5 to increase the flow velocity under diameter reducing and throttling effects of the side rear reducing holes 5, so as to form the jet flow at the tail of the perforated jet rear cover 3, thereby disturbing alternate shedding of a vortex on the counter flow side of the riser 1. The horizontal rectangular grooves 11 and the small impellers 9 are arranged in the vertical direction, so that the flow velocity of the ocean current that flows out from the lateral diversion holes 12 are non-uniform in the vertical direction, thereby destroying a three-dimensional spatial structure of a flow field around the riser 1. The ocean current which flows inside the device drives the center impeller 8 to rotate clockwise, so as to drive the small impellers 9 to rotate anticlockwise, thereby achieving an accelerating effect on the ocean current in the device. The small impellers 9 are arranged in the vertical direction according to certain space, so that the flow direction of the ocean current transfers in the vertical direction. In addition, a limiting spring limits relative displacement of the two empennages 6, and the jet flows jetted from the side rear reducing holes 5 impact on the empennages 6, so that the empennages 6 perform rotary opening and closing motion 6 around the empennage support column, thereby disturbing the development of a shear layer, and suppressing the formation of the vortex. Therefore, under a combined action of drainage and space allocation of horizontal rectangular grooves 11, flow rate distribution of the center impeller 8, flow direction adjustment of the small impellers 9, diversion of lateral diversion holes 12, jet flows of side rear reducing holes 5, and flowing space division and wake vortex turbulence of rotary swinging empennages 6, around-flow boundary layers of the two sides and the tail of the riser 1 are deeply damaged, which suppresses the formation of large vortexes, thereby realizing suppression of vortex-induced vibration by combining advantages of active and passive suppression.

What is claimed is:

1. A bullhead-shaped grooved diversion jet and empennage swing vibration suppression device, consisting of an impeller diversion module and a drainage rotary cover module, wherein the impeller diversion module comprises a center impeller, two sleeve bearings, eight small impellers, and two small impeller rotating shafts; the drainage rotary cover module comprises a drainage front cover, a perforated jet rear cover, and two empennages; the center impeller is of a first inner-outer ring structure embedded with a first cylindrical roller; an inner ring of the center impeller is fixed to an outer wall of a riser; arc-shaped blades are uniformly distributed in a circumferential direction of a surface of an outer ring; under impact-impact of a water flow, the center impeller may rotate clockwise around the riser; each sleeve bearing is of a second inner-outer ring structure embedded with a second cylindrical roller; the two sleeve bearings are mounted on the outer wall of the riser at an interval of greater than a height of one center impeller in a sleeving manner, and are distributed on the upper side and a lower side of the center impeller; an upper annular end surface and a lower annular end surface of the drainage front cover are respectively mounted on an upper surface of an upper sleeve bearing of the two sleeve bearings and a lower surface of a lower sleeve bearing of the two sleeve bearings in a clamping manner; an upper annular surface and a lower annular surface of the perforated jet rear cover are also respectively mounted on the upper surface of the upper sleeve bearing and the lower surface of the lower sleeve bearing in a clamping manner; the drainage front cover is seamlessly butted with the perforated jet rear cover by bolts; an empennage support column for fixing the empennages is mounted on an outer wall surface of one side, provided with a fan-shaped bump, of the perforated jet rear cover; one end of each empennages is mounted on the empennage support column in a sleeving manner, and an other end of the two empennages may rotate around the empennage support column; a spring is connected between the two empennages, so as to limit relative displacement between the two empennages, wherein the drainage front cover is one third of a hollow cylinder, and a circular front drainage hole is formed in the center of a convex surface, directly facing an incident flow direction, of the drainage front cover; the perforated jet rear cover is a hollow elliptical cylinder provided with a gap, and a minor axis of the elliptical cylinder is equal to a diameter of a cylinder of the drainage front cover; the drainage front cover; fills a circumferential gap of the perforated jet rear cover; an integrated drainage rotary cover is formed after the drainage front cover is butted with the perforated jet rear cover, and the center impeller is covered therein; symmetrical lateral diversion holes are formed in two side surfaces of the perforated jet rear cover in a minor axis direction of the elliptical cylinder; the fan-shaped bump is arranged on an inner wall surface, directly facing the front drainage hole of the drainage front cover, of the perforated jet rear cover; symmetrical side rear reducing holes are formed in the wall, on two sides of the fan-shaped bump, of the perforated jet rear cover; diameters of the side rear reducing holes are gradually reduced from inside to outside; four equally spaced horizontal rectangular grooves are formed in an inner wall of the drainage rotary cover formed by the drainage front cover and the perforated jet rear cover; circular holes for fixing the small impellers are symmetrically formed in the upper annular surface and the lower annular surface of the perforated jet rear cover in the minor axis direction; the two small impeller rotating shafts penetrate through the circular holes and are fixed to two sides of the center impeller; four small impellers are mounted in an axial direction of each small impeller rotating shaft at equal space in a sleeving manner; the orientations of concave surfaces of arc-shaped blades of the small impellers are opposite to an orientation of a concave surface of an arc-shaped blade of the center impeller.

2. The bullhead-shaped grooved diversion jet and empennage swing vibration suppression device according to claim 1, wherein a space between a lower surface of the upper sleeve bearing and an upper surface of the center impeller is one third of a height of one sleeve bearing; the space between an upper surface of the lower sleeve bearing and a lower surface of the center impeller is one third of the height of one sleeve bearing; a an angle of an arc corresponding to the front drainage hole is 20 degrees.

3. A bullhead-shaped grooved diversion jet and empennage swing vibration suppression method, using the bullhead-shaped grooved diversion jet and empennage swing vibration suppression device according to claim 1, the method comprises following steps:

rotating the empennages under the impact of the ocean current to drive the overall device to rotate to a counter flow side of the riser when an ocean current flows through the riser and forms attack angles with the empennages, a central line of an acute angle of the two empennages being parallel to the velocity direction of the ocean current;

impacting on arc-shaped blades of the center impeller, by the ocean current flowing into the drainage hole of the drainage front cover, to drive the center impeller to rotate, wherein a water flow impact force that is directly applied to the riser originally is dissipated, and the rotation of the center impeller allows flow rates of the ocean current that flows through two sides of the center impeller to be unequal, realizing flow rate allocation in space;

flowing the ocean current around the two sides of the center impeller, and flowing along the hollow channel of the device and the horizontal rectangular grooves of a cover wall;

driving the small impellers to rotate when the ocean current flows to the small impellers, further adjustsing the flow velocity and the flow direction of the ocean current;

jetting one part of the ocean current out from the lateral diversion holes along the tangential direction of the rotation of the small impellers, in a manner that a jet flow is perpendicular to the direction of the ocean current outside the cover, to inject kinetic energy of a fluid into an around-flow boundary layer of the drainage rotary cover, and in turn migrate a boundary layer separation point backwards;

flowing the other part of the ocean current along the horizontal rectangular grooves and reaching the side rear reducing holes to increase the flow velocity under diameter reducing and throttling effects of the side rear reducing holes, so as to form the jet flow at the tail of the perforated jet rear cover, thereby disturbing alternate shedding of a vortex on the counter flow side of the riser;

wherein the horizontal rectangular grooves and the small impellers are arranged in the vertical direction, so that the flow velocity of the ocean current that flows out from the lateral diversion holes are non-uniform in the vertical direction, thereby destroying a three-dimensional spatial structure of a flow field around the riser; the ocean current which flows inside the device drives the center impeller to rotate clockwise, so as to drive the small impellers to rotate anticlockwise, thereby achieving an accelerating effect on the ocean current in the device; wherein the small impellers are arranged in the vertical direction according to certain space, so that the flow direction of the ocean current transfers in the vertical direction; in addition, a limiting spring limits relative displacement of the two empennages, and the jet flows jetted from the side rear reducing holes, impact the empennages, so that the empennages perform rotary opening and closing motion around the empennage support column, thereby disturbing the development of a shear layer, and suppressing the formation of the vortex; therefore, under a combined action of drainage and space allocation of the horizontal rectangular grooves, flow rate distribution of the center impeller, flow direction adjustment of the small impellers, diversion of the lateral diversion holes, jet flows of the side rear reducing holes, and flowing space division and wake vortex turbulence of rotary swinging empennages, around-flow boundary layers of the two sides and the tail of the riser are deeply damaged, which suppresses the formation of large vortexes, thereby realizing suppression of vortex-induced vibration by combining advantages of active and passive suppression.

* * * * *